(12) United States Patent
Chambers et al.

(10) Patent No.: US 6,996,657 B1
(45) Date of Patent: *Feb. 7, 2006

(54) APPARATUS FOR PROVIDING PACKETS IN A PERIPHERAL INTERFACE CIRCUIT OF AN I/O NODE OF A COMPUTER SYSTEM

(75) Inventors: Eric G. Chambers, Austin, TX (US); Tahsin Askar, Round Rock, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 414 days.

This patent is subject to a terminal disclaimer.

(21) Appl. No.: 10/103,238

(22) Filed: Mar. 21, 2002

(51) Int. Cl.
 *G06F 12/36* (2006.01)
(52) U.S. Cl. .................... 710/310; 711/113; 711/118; 711/119; 711/120; 711/121; 345/557
(58) Field of Classification Search ............... 710/310; 711/113, 118–146; 345/557
 See application file for complete search history.

(56) References Cited

U.S. PATENT DOCUMENTS

| | | | | |
|---|---|---|---|---|
| 4,949,301 A | * | 8/1990 | Joshi et al. .................. | 711/100 |
| 5,182,752 A | * | 1/1993 | DeRoo et al. ............... | 714/758 |
| 5,369,641 A | * | 11/1994 | Dodt et al. .................. | 714/702 |
| 5,379,289 A | * | 1/1995 | DeSouza et al. ............ | 370/230 |
| 5,550,803 A | * | 8/1996 | Crayford et al. ............ | 370/246 |
| 5,857,082 A | * | 1/1999 | Murdoch et al. ........... | 710/310 |
| 5,870,568 A | * | 2/1999 | Culley et al. ............... | 710/306 |
| 5,878,045 A | * | 3/1999 | Timbs ........................ | 370/466 |
| 5,961,640 A | * | 10/1999 | Chambers et al. .......... | 712/300 |
| 6,170,030 B1 | * | 1/2001 | Bell ........................... | 710/310 |
| 6,278,532 B1 | | 8/2001 | Heimendinger et al. | |
| 6,330,630 B1 | * | 12/2001 | Bell ........................... | 710/312 |
| 6,414,961 B1 | | 7/2002 | Katayanagi | |
| 6,433,787 B1 | * | 8/2002 | Murphy ...................... | 345/556 |
| 6,463,060 B1 | * | 10/2002 | Sato et al. .................. | 370/389 |
| 6,487,637 B1 | * | 11/2002 | Arimilli et al. ............. | 711/133 |
| 6,542,982 B2 | * | 4/2003 | Murakami et al. .......... | 712/207 |
| 6,553,430 B1 | * | 4/2003 | Keller ........................ | 710/5 |
| 6,574,709 B1 | * | 6/2003 | Skazinski et al. ........... | 711/119 |
| 6,587,931 B1 | * | 7/2003 | Bauman et al. ............. | 711/145 |
| 6,745,272 B2 | * | 6/2004 | Owen et al. ................. | 710/107 |

(Continued)

OTHER PUBLICATIONS

"Efficient, Approximate Cache Invalidation for an Object Server," Jan. 1, 1994, IBM Technical Disclosure Bulletin, vol 37, Issue 1, p. 325-326.*

(Continued)

*Primary Examiner*—Glenn A. Auve
*Assistant Examiner*—Donna K. Mason
(74) *Attorney, Agent, or Firm*—Meyertons Hood Kivlin Kowert & Goetzel, P.C.; B. Noël Kivlin; Stephen J. Curran (57) ABSTRACT

An apparatus for providing packets in a peripheral interface circuit of an I/O node of a computer system. The apparatus includes a buffer that may be configured to accumulate data received on a first bus. The apparatus further includes a control unit coupled to the buffer which may be configured to transmit a data packet containing a first number of bytes of the data in response to detecting that any of the bytes of the data is invalid. The control unit may be further configured to transmit the data packet containing a second number of bytes of the data in response to detecting that all of the bytes are valid.

28 Claims, 7 Drawing Sheets

U.S. PATENT DOCUMENTS

| | | | |
|---|---|---|---|
| 6,834,319 B1 * | 12/2004 | Berndt | 710/307 |
| 2002/0029311 A1 * | 3/2002 | Joyeau et al. | 710/310 |
| 2002/0044550 A1 * | 4/2002 | Keller | 370/386 |

OTHER PUBLICATIONS

U. S. Appl. No. 09/399,281, filed Sep. 17, 1999.

* cited by examiner

| Bit-Time | 7 | 6 | 5 | 4 | 3 | 2 | 1 | 0 |
|---|---|---|---|---|---|---|---|---|
| 0 | | | | Mask[7:0] | | | | |
| 1 | | | | Mask[15:8] | | | | |
| 2 | | | | Mask[23:16] | | | | |
| 3 | | | | Mask[31:24] | | | | |
| 4 | | | | Data[7:0] | | | | |
| 5 | | | | Data[15:8] | | | | |
| 6 | | | | Data[23:16] | | | | |
| 7 | | | | Data[31:24] | | | | |
| 8+ | | | | Packet may contain up to 32 bytes of data | | | | |

*FIG. 6*

| Bit-Time | 7 | 6 | 5 | 4 | 3 | 2 | 1 | 0 |
|---|---|---|---|---|---|---|---|---|
| 0 | | | | Data[7:0] | | | | |
| 1 | | | | Data[15:8] | | | | |
| 2 | | | | Data[23:16] | | | | |
| 3 | | | | Data[31:24] | | | | |
| 4 | | | | Data[39:32] | | | | |
| 5 | | | | Data[47:40] | | | | |
| 6 | | | | Data[55:48] | | | | |
| 7 | | | | Data[63:56] | | | | |
| 8+ | Packet may contain up to 64 bytes (16 DW) of data | | | | | | | |

APPARATUS FOR PROVIDING PACKETS IN A PERIPHERAL INTERFACE CIRCUIT OF AN I/O NODE OF A COMPUTER SYSTEM

BACKGROUND OF THE INVENTION

1. Field of the Invention

This invention relates to computer system input/output and, more particularly, to peripheral transaction handling within an input/output node.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many shared bus systems suffer from drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by many systems is a front side bus (FSB), which may typically interconnect one or more processors and a system controller.

To overcome some of the drawbacks of a shared bus, some computers systems may use packet-based communications between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Certain packet-based interconnects or buses may use certain types of packets. For example, in some packet-based interconnects such as those that support the HyperTransport™ protocol, double word transactions may be used as the default packet type for certain memory transactions since byte-mode transactions may incur more system overhead. Thus when devices connected to a peripheral bus, such as a peripheral component interconnect (PCI) bus for example, initiate the transactions it may be advantageous to use corresponding double word transactions in the packet-based interconnect when possible.

SUMMARY OF THE INVENTION

Various embodiments of an apparatus for providing packets in peripheral interface circuit of an I/O node of a computer system are disclosed. In one embodiment, the apparatus includes a buffer that may be configured to accumulate data received on a first bus, such as a peripheral bus for example. The apparatus further includes a control unit coupled to the buffer which may be configured to transmit a data packet containing a first number of bytes of the data in response to detecting that any of the bytes of the data is invalid. The control unit may be further configured to transmit the data packet containing a second number of bytes of the data in response to detecting that all of the bytes are valid.

In one particular implementation, the control unit may be further configured to detect whether any intervening bytes in a contiguous group of data forming the first number of bytes received in the buffer is invalid. The control unit may further generate the data packet containing the first number of bytes in response to detecting any intervening invalid bytes in the contiguous group of data forming the first number of bytes. In addition, the first number of bytes may include up to 32 bytes of data and four bytes of masking information, where the masking information may be indicative of which of the first number bytes of data in the data packet is valid.

In another particular implementation, the control unit may be further configured to detect whether any intervening bytes in a contiguous group of data forming the second number of bytes received in the buffer is invalid. The control unit may further generate the data packet containing the second number of bytes in response to detecting no intervening invalid bytes in the contiguous group of data forming the second number of bytes. Further, the second number of bytes may include up to 16 contiguous double words of data.

In yet another specific implementation, the control unit may be further configured to generate the data packet containing a third number of bytes of data in response to detecting an invalid data byte after receiving the third number of bytes in a contiguous group of data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
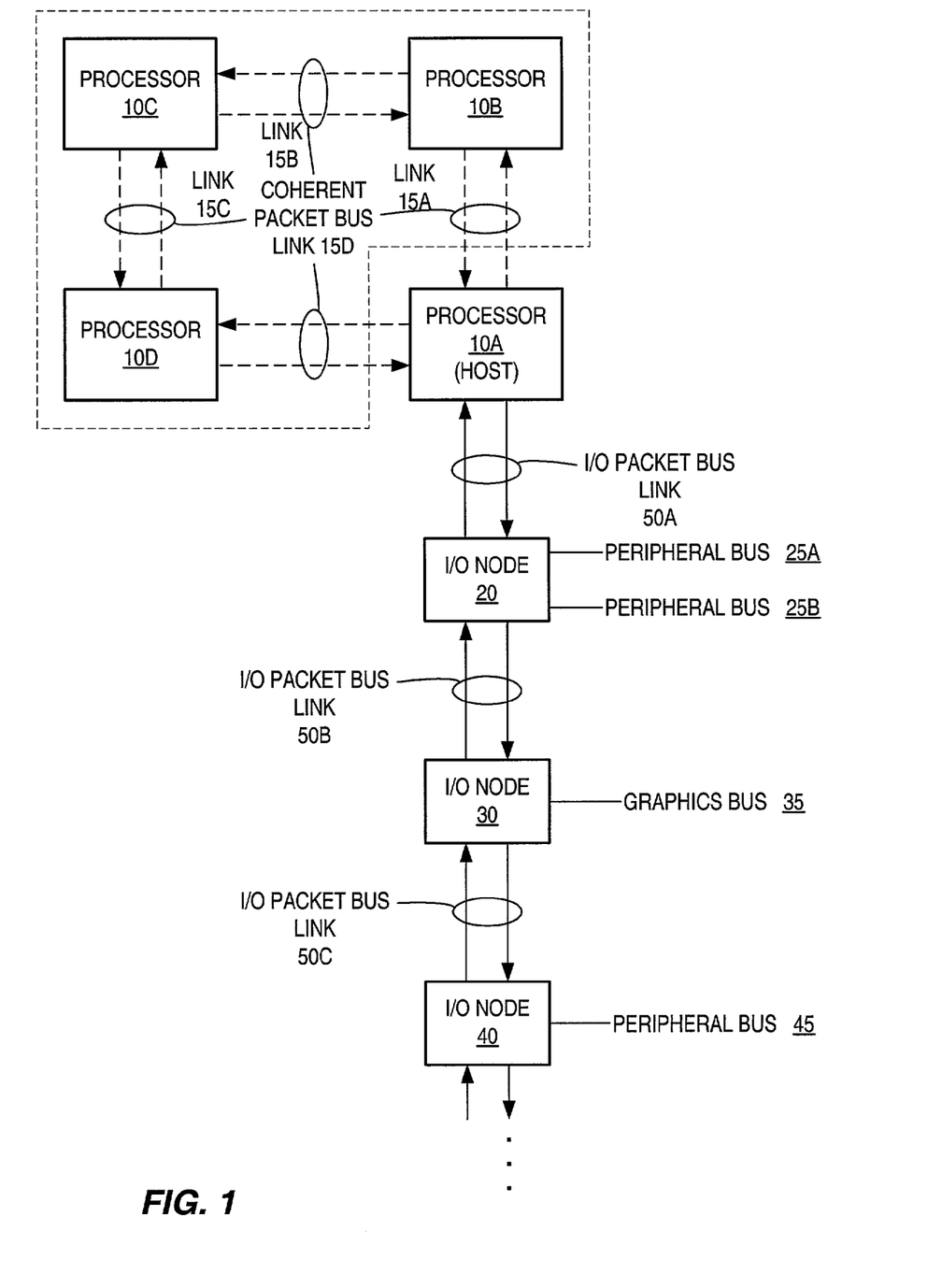
FIG. 1 is a block diagram of one embodiment of a computer system.

Turning now to FIG. 1, a block diagram of one embodiment of a computer system is shown. The computer system includes processors 10A–10D each interconnected by a coherent packet bus including links 15A–D. Each link of coherent packet bus 15 may form a high-speed point-to-point link. The computer system also includes three I/O nodes numbered 20, 30 and 40 each connected together in a chain by non-coherent (NC) packet bus links 50B and 50C respectively. NC packet bus link 50A is coupled between host node/processor 10A and I/O node 20. Processor 10A is illustrated as a host node and may include a host bridge for communicating with I/O node 20 via NC packet bus link 50A. Processors 10B–D may also include host bridges for communication with other I/O nodes (not shown). The NC packet bus links formed by NC packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45. It is noted that in other embodiments, other numbers of processors may be used.

In the present embodiment, each link of coherent packet bus 15 is implemented as sets of unidirectional lines (e.g. lines 15A are used to transmit packets from processor 10A to processor 10B and lines 15B are used to transmit packets from processor 10B to processor 10C). Other sets of lines 15C–D are used to transmit packets between other processors as illustrated in FIG. 1. The coherent packet bus 15 may be operated in a cache coherent fashion for communication between processing nodes ("the coherent link"). Further, non-coherent packet bus 50 may be operated in a non-coherent fashion for communication between I/O nodes and between I/O nodes and a host bridge such as the host bridge of processor 10A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processor to another may pass through one or more intermediate nodes. For example, a packet transmitted by processor 10A to processor 10C may pass through either processor 10B or processor 10D as shown in FIG. 1. Any suitable routing algorithm may be used.

Processors 10A–10D are each illustrative of, for example, an x86 microprocessor such as an Athlon™ microprocessor. In addition, one example of a packet bus such as non-coherent packet bus 50 may be compatible with HyperTransport™ technology. Peripheral buses 25A, 25B and 45 are illustrative of a common peripheral bus such as a peripheral component interconnect (PCI) bus and graphics bus 35 is illustrative of an accelerated graphics port (AGP) interconnect, for example. It is understood, however, that other types of processors and buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of processor 10A from an I/O node and "downstream" refers to packet traffic flow in the direction away from the host bridge of processor 10A to an I/O node.

During operation, I/O node 20 and 40 may translate transactions such as PCI or PCIX bus transactions, for example, into upstream packet transactions that travel in I/O streams and additionally may translate downstream packet transactions into PCI or PCIX bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. In the present embodiment, I/O node 20 may not forward packets to a peripheral device on peripheral bus 25 from downstream; the packets are first transmitted upstream to the host bridge of processor 10A. The host bridge of processor 10A may then transmit or "reflect" the packets back downstream with a Unit ID of the host bridge of processor 10A where I/O node 20 recognizes and claims the packet for the peripheral device on peripheral bus 25. I/O node 20 may then translate the packets into peripheral bus transactions and transmit the transactions to the peripheral device on peripheral bus 25.

Further, transactions originating at the host bridge of processor 10A will also contain the Unit ID of the host bridge of processor 10A.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

Figure 6:
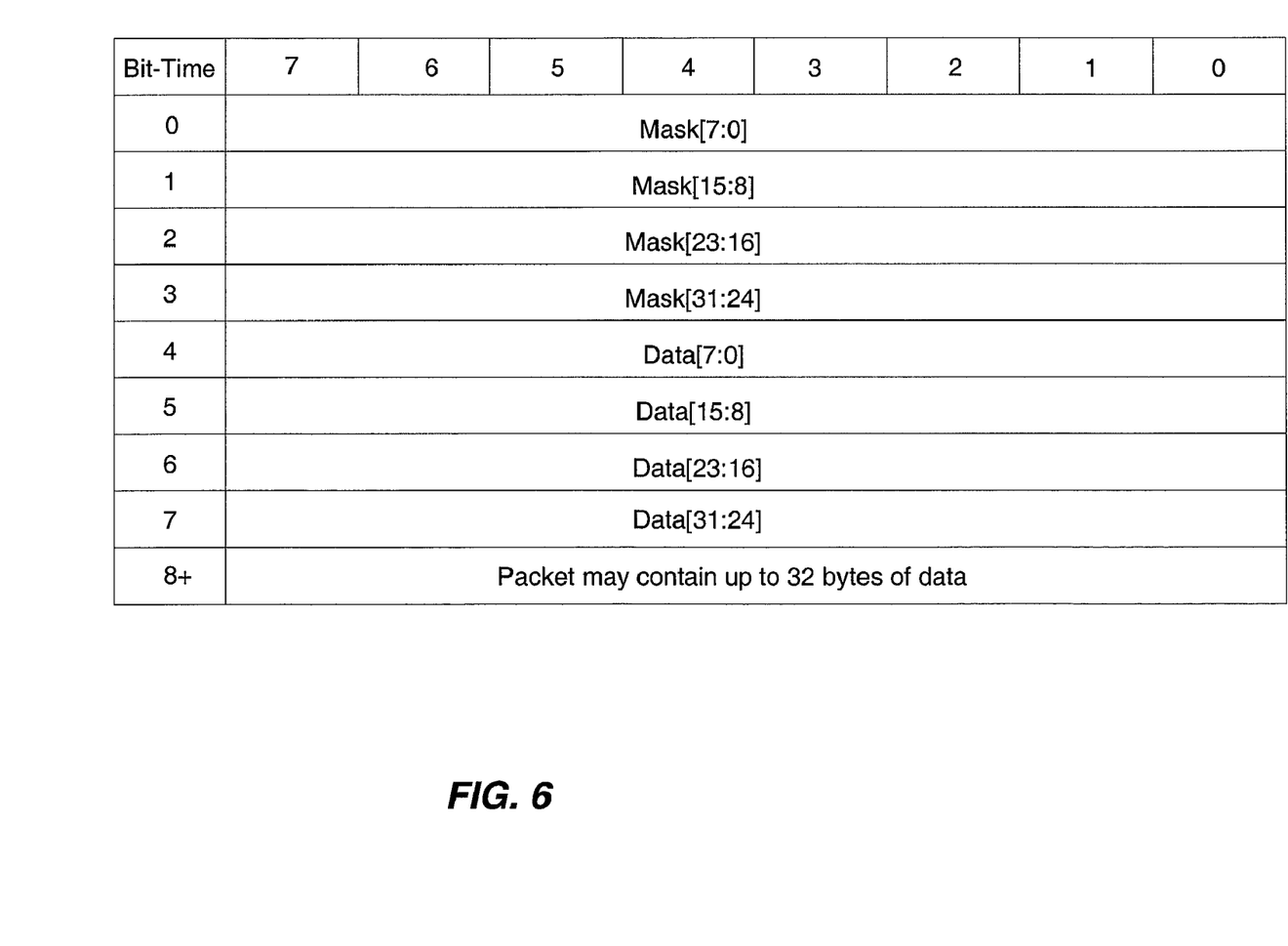
FIG. 6 is a diagram of one embodiment of a sized write data packet in byte mode.
Figure 7:
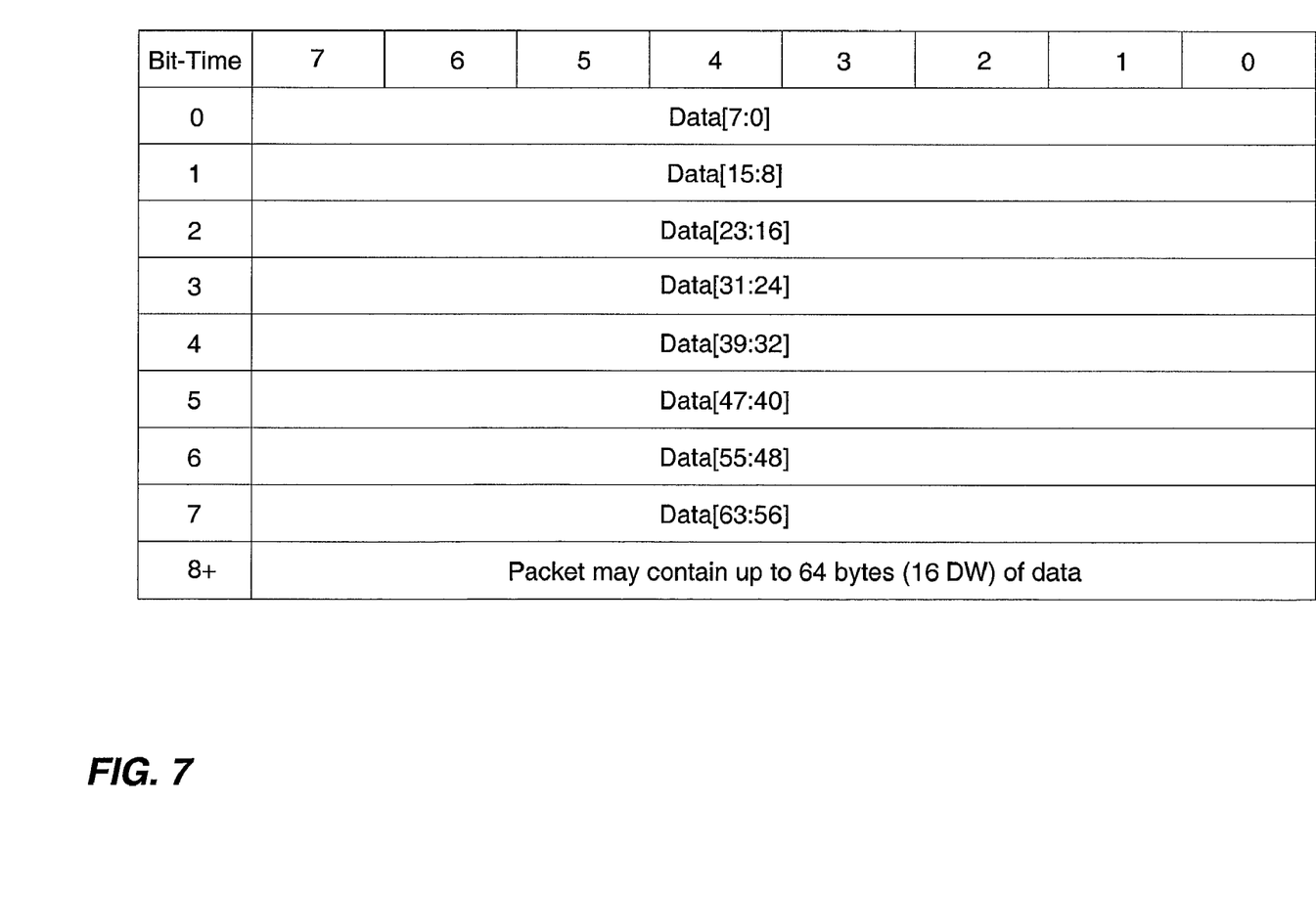
FIG. 7 is a diagram of one embodiment of a sized write data packet in double word mode.

In one embodiment, packets may be conveyed in double word mode or byte mode. An example of one embodiment of a double word mode data packet is illustrated in FIG. 7 and an example of one embodiment of a byte mode format data packet is illustrated in FIG. 6. The particular format used may be dependent on such factors as the whether contiguous data bytes in a given upstream transaction are valid, for example. As will be described further below, data packets transferred in byte mode may include valid data masking bits and thus may not transfer as much data per packet as a data packet formatted in double word mode.

Generally, each node may contain buffers (not shown) for managing packet flow throughout the fabric. In one embodiment, a cache line of data is 64 bytes and transactions may be aligned on 64-byte boundaries. Thus for memory write operations, a data packet size may include 64 bytes of data aligned on a 64-byte boundary and sent in double word format. Therefore, buffer management logic (not shown in FIG. 1) within an I/O node may allocate buffer space within the buffers based upon 64-byte transfers. More specifically, in one embodiment, buffer management logic may assume double word transfers and thus allocate space for up to 64 bytes of data for a given upstream command. However, if a given transaction includes invalid data bytes interleaved between valid bytes, for example, it may be necessary to transfer the data packets in a byte mode format, which may only transfer up to 32 bytes of data.

Figure 2:
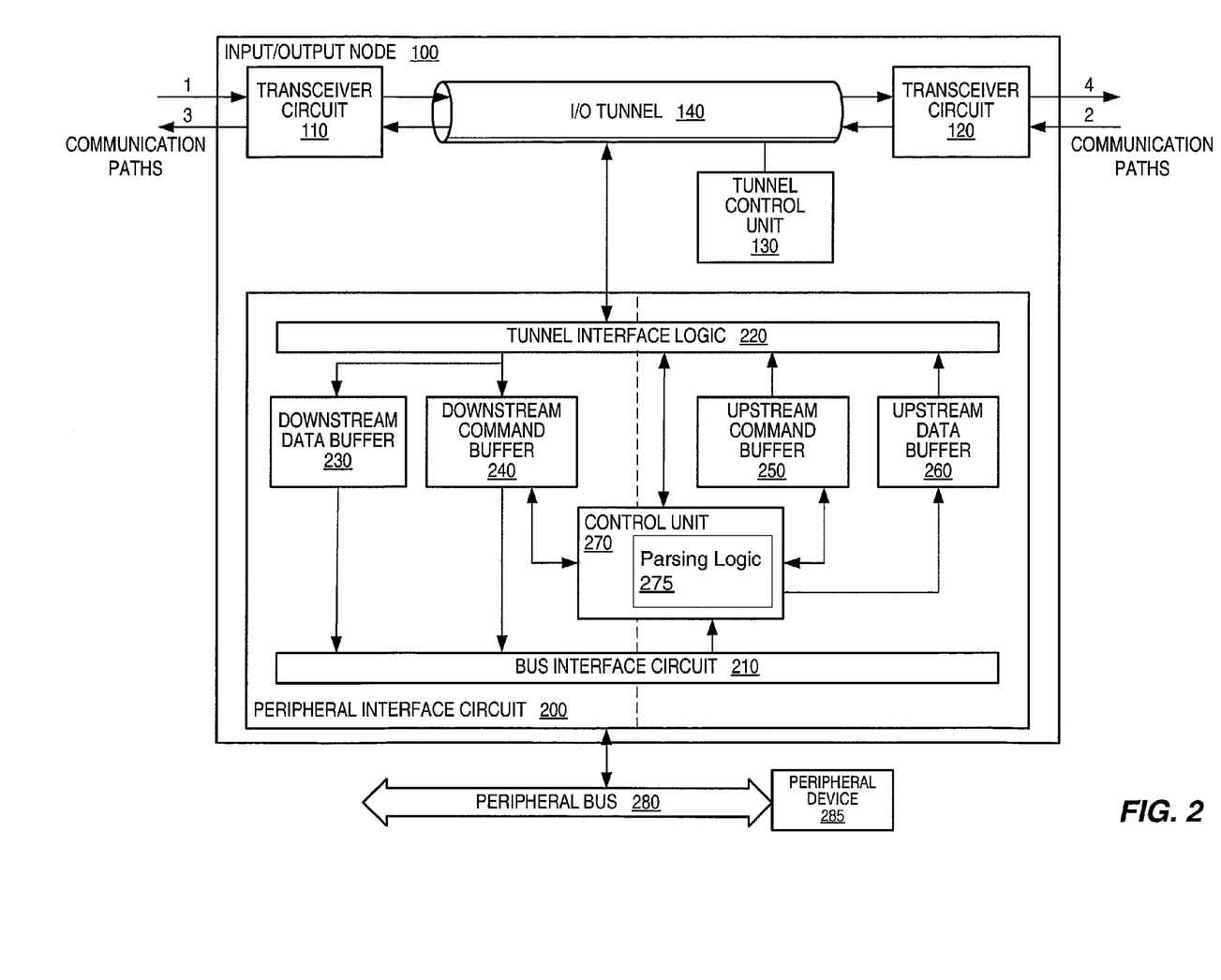
FIG. 2 is a block diagram of one embodiment of an input/output node.

Referring to FIG. 2, a block diagram of one embodiment of an input/output node is shown. The I/O node in FIG. 2 is representative of any of I/O nodes 20, 30 or 40 of FIG. 1 and will hereafter be referred to as I/O node 100 for simplicity. I/O node 100 of FIG. 2 includes a transceiver circuit 110 and a transceiver circuit 120. Transceiver circuits 110 and 120 are coupled together through an I/O tunnel 140. Transceiver circuits 110 and 120 may each include a transmitter and a receiver (not shown). The transmitters and receivers may be connected through I/O tunnel 140 such that the receiver of transceiver 110 may be coupled to the transmitter of transceiver 120 and the receiver of transceiver 120 may be coupled to the transmitter of transceiver 110. I/O tunnel 140 may include command and data buses (not shown) used to forward packet traffic through I/O node 100. In addition, I/O node 100 includes a peripheral interface circuit 200, which is also coupled to transceivers 110 and 120 through I/O tunnel 140. However as described above, packets which originate at peripheral interface circuit 200 and then enter I/O tunnel 140 may be referred to as injected packets. I/O node 100 also includes a tunnel control unit 130 which is coupled to control the transactions between transceivers 110 and 120 and peripheral interface 200. I/O node 100 is also coupled to a peripheral device 285 via a peripheral bus 280.

In the illustrated embodiment, transceivers 110 and 120 are part of two uni-directional communication paths through I/O tunnel 140. Since each of the communication paths is unidirectional, either path may be connected as the upstream or downstream path. Thus, the injected traffic from peripheral interface circuit 200 may be provided to either of transceivers 110 and 120. Transceivers 110 and 120 and peripheral interface circuit 200 may each receive packets into a receive buffer (not shown). As each packet is received, a control command may be generated containing a subset of the information contained in the received command. The control command may include the Unit ID of the originating node, destination information, a data count and transaction type, for example. It is noted that the control command may include other information or may not include some of the information listed here. The control command may be sent from transceivers 110 and 120 and peripheral interface circuit 200 to tunnel control unit 130. Tunnel control unit 130 may further determine through an arbitration process which of the received packets may be sent and to indicate to send the winning packets to the their destination.

In the illustrated embodiment, peripheral interface circuit 200 may include a downstream section and an upstream section. The downstream section may handle downstream packets whose destination may be peripheral device 285. The upstream section may handle packets corresponding to transactions which originate from devices such as peripheral device 285. Thus, peripheral interface circuit 200 includes a downstream command buffer 240 and a downstream data buffer 230, each coupled to I/O tunnel 140 via tunnel interface logic 220. Downstream command buffer 240 and downstream data buffer 230 are each coupled to peripheral bus 280 via bus interface circuit 210. Peripheral interface circuit 200 also includes an upstream command buffer 250 and an upstream data buffer 260, each coupled to I/O tunnel 140 via tunnel interface logic 220. Upstream command buffer 250 and upstream data buffer 260 are also each coupled to peripheral bus 280 via bus interface circuit 210. Peripheral interface circuit 200 further includes a control unit 270 which is coupled to both upstream command buffer 250 and upstream data buffer 260.

It is noted that in the illustrated embodiment, peripheral bus 280 is illustrative of a variety of common peripheral buses such as a PCI bus, a PCI-X bus and an AGP bus for example. Additionally, bus interface circuit 210 may include circuitry for translating peripheral bus commands from such buses. Further, it is contemplated that in one particular embodiment, bus interface circuit 210 may be a bus interface such as a Compaq™ Rapid Enabler for PCI-X (CREX) interface. Lastly, it is contemplated that in certain embodiments, I/O node 100 may include more than one peripheral interface circuit (not shown) for connection to multiple peripheral buses and that in such embodiments, arbitration logic (not shown) may arbitrate between commands sent from each of the multiple peripheral interface circuits.

Packets may be sent to peripheral interface circuit 200 from either transceiver circuit 110 or 120 depending on which transceiver is connected as the downstream receiver. Command packets may be stored in downstream command buffer 240 and data packets may be stored in downstream data buffer 230. Likewise, when a command is received from bus interface circuit 210, the corresponding command packet may be stored in upstream command buffer 250 and the data packet(s) may be stored in upstream data buffer 260. Control unit 270 may also be configured to control the conveyance of the packets to and from bus interface 210 and I/O tunnel 140.

In response to peripheral interface circuit 200 receiving upstream transactions from peripheral bus 280, control unit 270 may generate control commands similar to the control commands generated by transceivers 110 and 120. Control unit 270 may also send those control commands to tunnel control unit 130, thus allowing upstream commands to be scheduled into I/O tunnel 140. As will be described in greater detail below, parsing logic 275 within control unit 270 may generate command and data packets corresponding to the commands received from bus interface circuit 210. In one embodiment, depending on the control information received with a given transaction, the data packets may be generated in either a double word mode or a byte mode format.

When peripheral device 285 initiates a bus cycle upon peripheral bus 280, bus interface circuit 210 may translate that cycle into a command usable by control unit 270. Control unit 270 may then generate command and data packets as described above. The data packets may be stored in data buffer 260 while the command packets may be stored in upstream command buffer 250. As will be described in greater detail below, prior to storage in upstream command buffer 250 and depending on the type of command, parsing logic 275 may also create a number of smaller commands. For example, if peripheral device 285 requests a posted write of a large block of data to a system memory, parsing logic 275 may create a number of posted write commands to the same block of memory but in smaller blocks. It is contemplated that in one embodiment, the blocks may be created along cache line boundaries. Subsequently, each of the posted commands may be stored in upstream command buffer 250. Non-posted read commands may also be broken up depending on the boundaries of the requests and whether the transactions are PCI or PCI-X.

As upstream command packets are generated and stored in upstream command buffer 250, control unit 270 may generate control commands similar to the control commands generated by transceivers 110 and 120. Control unit 270 may also send those control commands through tunnel interface logic 220 to tunnel control unit 130, thus allowing upstream commands to be scheduled into I/O tunnel 140. Tunnel interface logic 220 may include general purpose buffering circuitry (not shown) as necessary for interfacing between I/O tunnel 140 and logic within peripheral interface circuit 200.

In addition, as will be described in greater detail below in conjunction with the description of FIG. 3, depending on the type of transaction received from peripheral bus 280, parsing logic 275 may create data packets using double word mode and may align the received data into double words dependent upon such factors as whether a ½ cache line boundary has been crossed and whether any invalid byte enables have been received in a given transaction.

Figure 3:
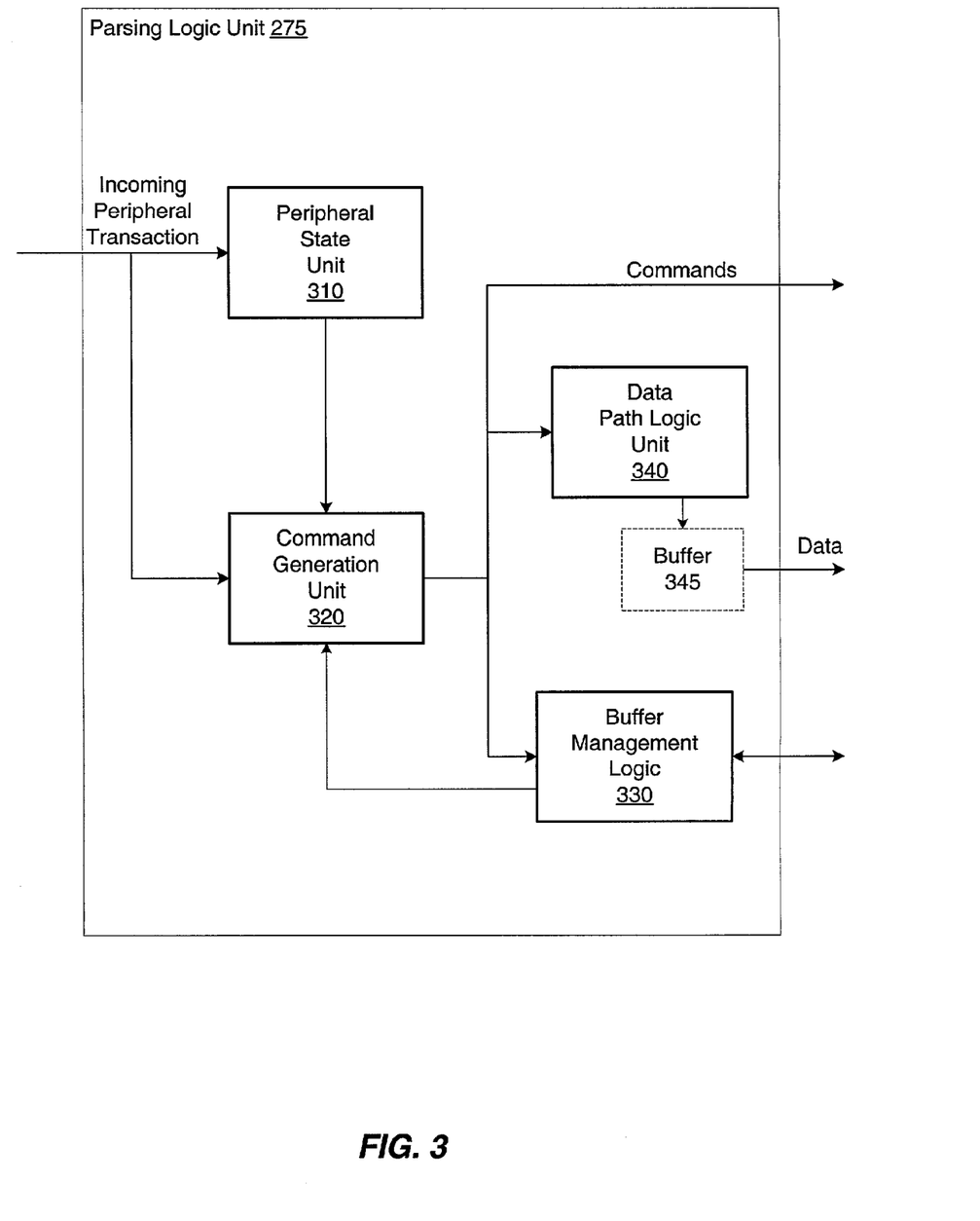
FIG. 3 is a block diagram of one embodiment of a parsing logic unit.

Referring to FIG. 3, a block diagram of one embodiment of a parsing logic unit is shown. Parsing logic unit 275 includes a peripheral state logic unit 310 which is coupled to a command generation unit 320. Command generation unit 320 is coupled to a buffer management unit 330 and to a data path logic unit 340. Data path logic unit 340 is coupled to a buffer unit 345. It is noted that although buffer unit 345 is shown within the boundaries of parsing logic 275, it is contemplated that in other embodiments, buffer unit 345 may be outside the boundaries of parsing logic 275.

As described above, data packets may be transferred across I/O packet bus links in either a byte mode or double word mode. In byte mode, a byte format data packet may include 32 bytes of data having invalid data bytes interleaved between valid data bytes and may be preceded by four bytes of byte mask information. An example of a byte mode data packet is illustrated in FIG. 6. In double word mode, a double word format data packet may include up to 64 bytes (16 double words) of contiguous valid data and may be transferred within a 64-byte aligned block. As described above, data transfers having greater than 64 bytes may be broken up into multiple transfers. An example of a double word mode data packet is illustrated in FIG. 7. As described above, various buffers may be used by the I/O nodes throughout the system. In one embodiment, each of these buffers may be configured to hold 64 bytes of data per buffer location (i.e. each buffer may be a one cache line buffer). Thus, before a data transfer is made, buffer space availability at the next destination may checked by buffer management unit 330 to ensure sufficient space is available.

Since byte mode transfers may be made with 32 bytes of data, as data is received and a command is being built, it may be necessary to keep track of whether a ½ cache line boundary (e.g. 32 bytes) has been crossed and whether an invalid data byte is received. For example, if during the current data transfer an invalid byte is detected and the current state has not crossed the ½ cache line boundary, the current double word command build may continue. If however, during the current command build an invalid byte is detected and the current state has crossed a ½ cache line boundary then the current double word command build may be stopped. By knowing this state information, parsing logic 275 may allow double word transfers to remain within a 64-byte aligned block, and byte transfers to be divided along naturally aligned 32-byte address regions.

Command generation unit 320 receives the incoming peripheral transactions from bus interface circuit 210 of FIG. 2. Command generation unit 320 is configured to build command and data packets suitable for transmission upon the fabric created by the various I/O packet bus links 50A–C of FIG. 1. For commands such as posted write commands to memory, command generation unit 320 may initially assume that the command and the data packet(s) associated with the command will be double word packets aligned on a 64-byte boundary unless invalid bytes are received and the ½ cache line boundary has been crossed. As data is received, the data bytes are accumulated in buffer 345. Command generation unit 320 may track the corresponding starting address and count the number of double words of received data. The count may continue until it reaches a maximum of 16 double words (i.e. 64 bytes) or a stop current command build signal is received. The stop current command build signal may be indicative that the current command build has crossed the ½ cache line boundary and an invalid byte has been detected. Once a command and data packets are generated, command generation unit 320 is also configured to generate and send the corresponding control commands to tunnel control unit 130 of FIG. 2 as described above.

If a command build is stopped due to invalid bytes being detected and the ½ cache line boundary has been crossed, command generation unit 320 may transfer the current command as a double word command if the data bytes received up to the ½ cache line boundary were valid (i.e. there were no invalid bytes detected between contiguous valid bytes). The command field of the command packet may indicate that it is a double word command and the count field may indicate the number of double words of data that will be transferred in the data packet(s). However, any data bytes that are part of the current command build but were received after the ½ cache line boundary may be included in a new command build. Depending on the where the invalid bytes are located relative to the double word alignment, the new command may also be a double word command or it may be necessary to build a byte mode command.

If invalid bytes are detected and the ½ cache line boundary has not been crossed, the current command build may proceed until the ½ cache line boundary is crossed. Once the ½ cache line boundary is crossed, the current command build may be stopped and a byte mode command may be generated including the appropriate byte masks indicative of the valid bytes in the byte mode data packet.

Peripheral state logic unit 310 also receives the incoming peripheral transactions from bus interface circuit 210 of FIG. 2. Using the control information, peripheral state logic unit 310 is configured to determine the relative position of the on-the-fly data transfer within the 64-byte aligned boundary of the current command being generated by command generation unit 320. As described above, along with byte enable information, peripheral state logic unit 310 determines whether or not to end the current command build if an invalid byte has been detected.

There may be exceptions to generating a byte mode command if invalid bytes are received. At the start of a new command build, receiving an invalid byte enable does not necessarily mean a byte mode command will be generated. For example, if the first double word of data has invalid byte enables, then that data may be disregarded and the starting address may be incremented to the next address of the next valid double word. The double word command build may proceed as if the data had not been received. Similarly, at the end of the current command build, if the last double word of data has invalid byte enables, it may be disregarded and the double word command may be finished and built.

As described above, data path logic unit 340 is coupled to buffer 345. However in alternative embodiments data path logic unit 340 may contain buffer storage units, such as registers or random access memory, for temporarily accumulating the received data bytes while command generation unit 320 generates the command and data packets. Data path logic unit 340 may also include logic (not shown) to multiplex the data and to justify data bytes having invalid byte enables within a packet.

Buffer management unit 330 is configured to determine how much buffer space may be needed to transfer the current command and data packets. Buffer management unit 330 currently creates a worse case assumption on the number of buffers required for the current transaction. For example, in one embodiment, buffer management unit 330 may assume that four 64-byte buffers are necessary. If sufficient buffer space is not available to begin, buffer management logic may issue a retry. If the peripheral bus is a PCIX bus and if buffer space is unavailable to continue a transaction, the transaction may be disconnected on an allowable disconnect boundary (e.g. 128-byte boundary).

In an alternative embodiment, command generation unit 320 may be configured to generate and send the control commands to tunnel control unit 130 dependent upon the type of memory write command being generated. For example, certain commands may be indicative that all the data bytes associated with that write command will be valid. Further, these special commands may also indicate the number of bytes of data in the transaction. For example, a command such as a memory write and invalidate (MemWrInv) command may contain one or more entire cache lines of valid data. Thus, if such a command is received and identified, then it may be possible to generate the command packet and the control command prior to receiving all of the data bytes at least up to the ½ cache line boundary. This may allow tunnel control unit 130 of FIG. 2 to arbitrate for the command packet while the data packet is still being built. Then when the command packet is picked as a winner, the data packet may be in upstream data buffer 260 ready to be sent. When receiving other memory write transactions, command generation unit 320 may typically wait to receive all data and corresponding byte enables before building the command and control command. Thus, it may be possible to realize some latency reduction if these special commands are received.

Figure 4:
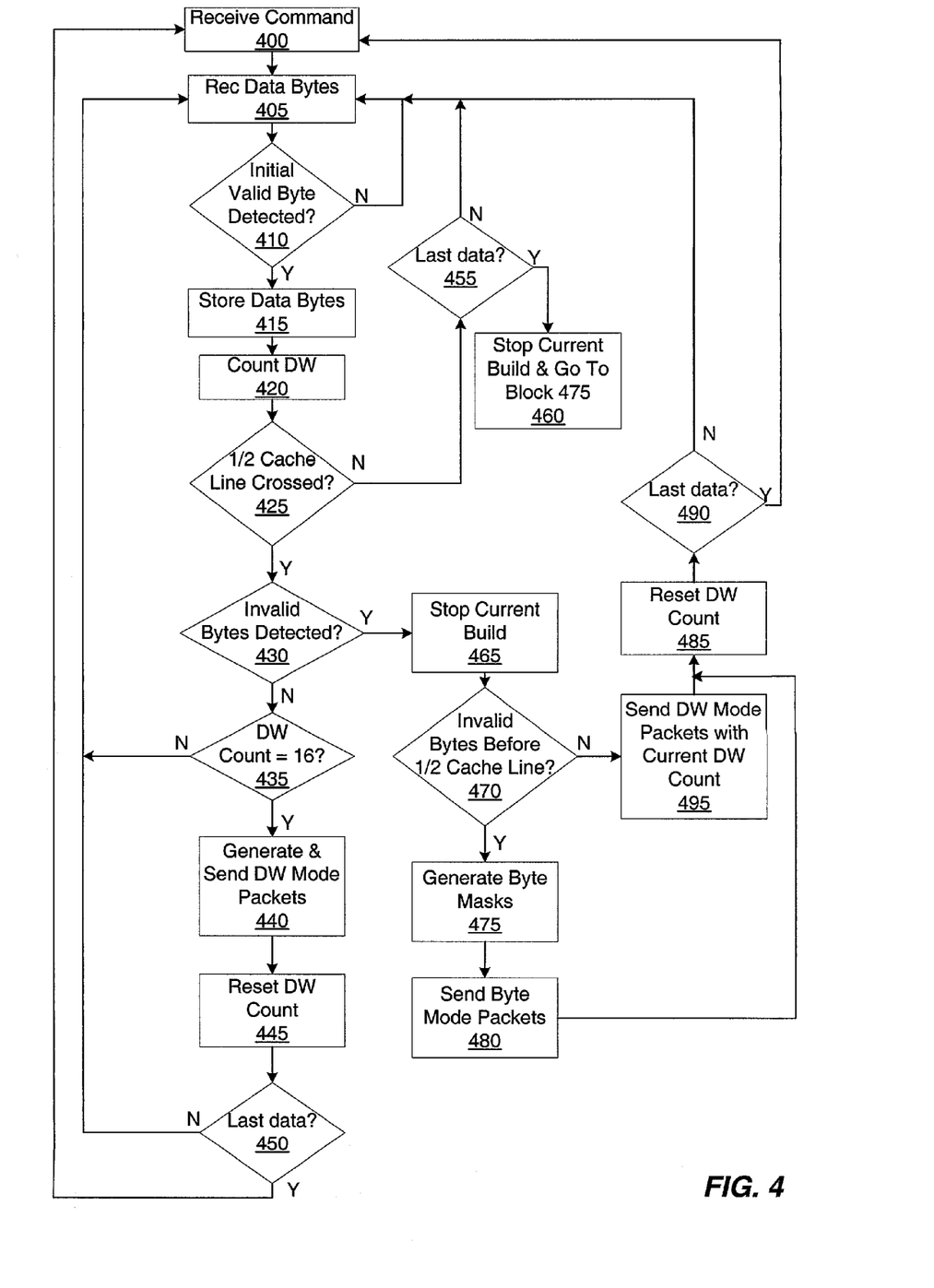
FIG. 4 is a flow diagram illustrating operation of one embodiment of a parsing logic unit.

Turning to FIG. 4, a flow diagram illustrating operation of one embodiment of a parsing logic unit is shown. Beginning in block 400, parsing logic 275 of FIG. 3 receives a command and corresponding data bytes (block 405). If the initial data bytes are not valid (block 410), command generation unit 320 may not begin a new command build until a valid data byte is detected. Once an initial valid byte has been detected (block 410), the data bytes are stored and accumulated in buffer storage 345 of data path logic unit 340 (block 415). Command generation unit 320 begins a new command build by storing the starting address of the first double word of the new command. Command generation unit 320 also counts the double words of data that are stored within data path logic unit 340 (block 420). Peripheral state unit 310 keeps track of whether the current build has crossed the ½ cache line boundary (block 425) and whether the byte enables corresponding to the received data bytes are valid (block 430).

If the ½ cache line has been crossed (block 425) and an invalid byte has not been detected (block 430), command generation unit 320 continues building the command and counting the contiguous double words until the double word count reaches 16 (block 435). When the double word count reaches 16, command generation unit 320 finishes building the command and generates a double word command and data packet using the 16 contiguous double words of data received. Command generation unit 320 then generates a control command corresponding to the double word command. Command generation unit 320 then causes the double word command and data packets to be sent to upstream command buffer 250 and upstream data buffer of FIG. 2, respectively (block 440). Command generation unit 320 also sends the control command to tunnel control unit 130 for scheduling of the injected command and data packet into the tunnel. Command generation unit 320 then resets the DW count (block 445) and stops the current command build. Command generation unit 320 checks to see if there is any remaining data to be transferred (block 450). If there is no more data, command generation unit 320 may wait for a new peripheral command to be received as described above in block 400. If there is remaining data, a new command build may be started as operation continues as described above in block 405.

If the ½ cache line has not been crossed (block 425), then peripheral state unit 310 checks to see if there is any data remaining to be transferred (block 455). If there is data to be transferred, operation continues as described above in block 405. However, if there is no more data, the current command build may be stopped (block 460) and operation continues as described below in block 475. It is noted however that in some corner cases, if the current command build is stopped as above in block 460 and all remaining data has invalid byte enables, a double word command may be generated, and thus operation may proceed to block 495 instead of block 475.

If the ½ cache line has been crossed (block 425) and an invalid byte has been detected (block 430), command generation unit 320 stops building the current command (block 465). If invalid bytes have been detected in the data bytes that are before the ½ cache line boundary (block 470), then command generation unit 320 generates byte masks indicative of which bytes are valid and a byte mode command and data packet using the data bytes received up to the ½ cache line boundary (block 475). Command generation unit 320 then generates a control command corresponding to the byte mode command. Command generation unit 320 then causes the byte mode command and data packet to be sent to upstream command buffer 250 and upstream data buffer of FIG. 2, respectively (block 480). Command generation unit 320 also sends the control command to tunnel control unit 130 for scheduling of the injected command and data packet into the tunnel. Command generation unit 320 may then reset the DW count (block 485). Command generation unit 320 checks to see if there is any remaining data to be transferred (block 490). If there is no more data, command generation unit 320 may wait for a new peripheral command to be received as described above in block 400. If there is remaining data, command generation unit 320 may begin a new command build using the data bytes that may have been received after the ½ cache line boundary and operation continues as described above in block 405.

If invalid bytes have not been detected in the data bytes received before the ½ cache line boundary (block 470), then command generation unit 320 generates a double word command and data packet using the contiguous double words of data received up to the invalid data byte. Command generation unit 320 may then generate a control command corresponding to the double word command. Command generation unit 320 may then cause the double word command and data packets to be sent to upstream command buffer 250 and upstream data buffer of FIG. 2, respectively (block 495). Command generation unit 320 also sends the control command to tunnel control unit 130 for scheduling of the injected command and data packet into the tunnel and may then reset the DW count (block 485). Command generation unit 320 checks to see if there is any remaining data to be transferred (block 490). If there is no more data, command generation unit 320 may wait for a new peripheral command to be received as described above in block 400. If there is remaining data, a new command build may be started as operation continues as described above in block 405.

In addition, some peripherals such as AGP, for example, may issue commands in which the incoming data may not be aligned to cache line boundaries. In one embodiment, command generation unit 320 may keep track of the whether the cache line boundary would be crossed in the current command build and if so, the incoming AGP command may be broken up so that the upstream data will be aligned to the cache line boundary.

Figure 5:
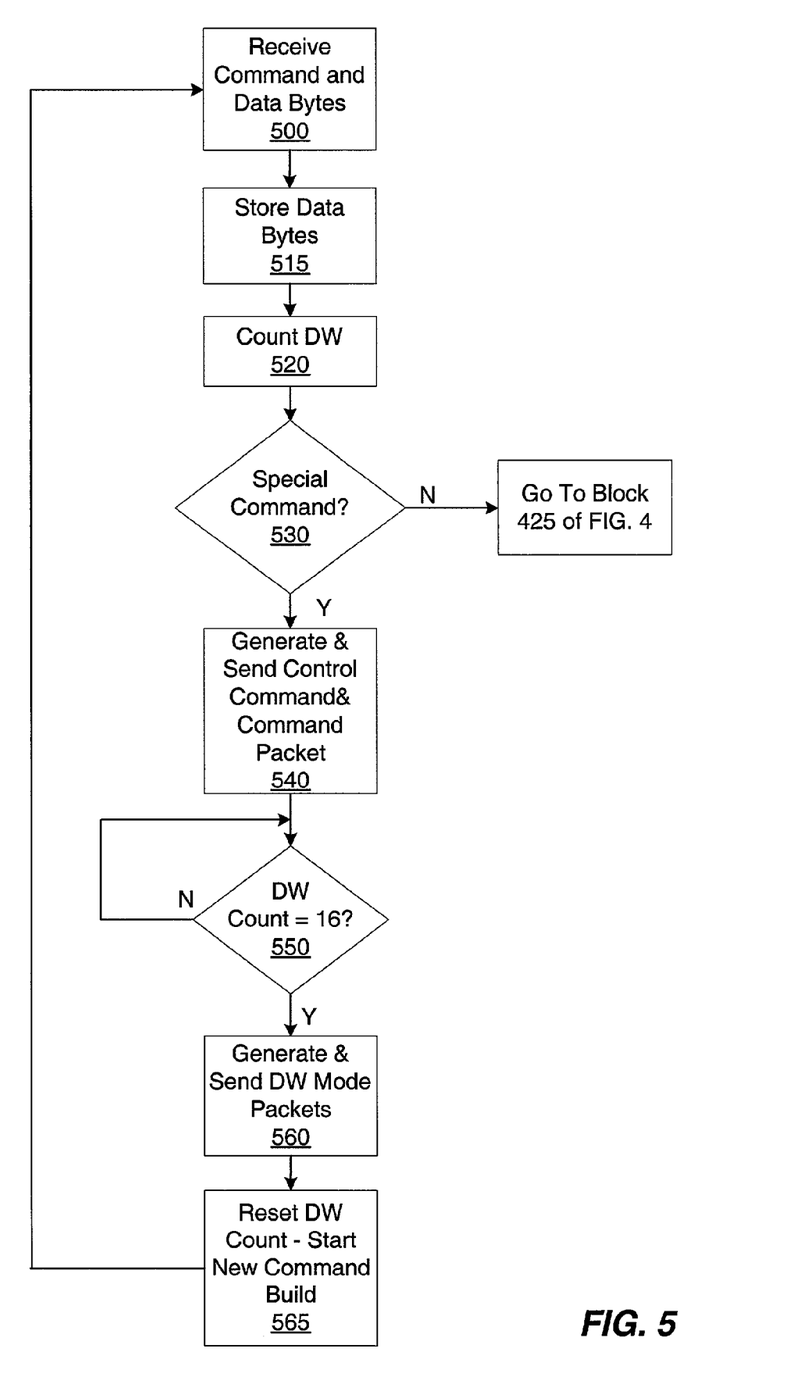
FIG. 5 is a flow diagram illustrating operation of another embodiment of a parsing logic unit.

Turning to FIG. 5, a flow diagram illustrating operation of another embodiment of a parsing logic unit is shown. Beginning in block 500, parsing logic 275 of FIG. 3 receives a command and corresponding data bytes. Command generation unit 320 begins a new command build, storing the starting address of the first double word of the new command (block 515). Command generation unit 320 also counts the double words of data that are stored within data path logic unit 340 (block 520). Buffer management logic 330 detects whether the command is a special command such as a memory write and invalidate command (MemWrInv), for example (block 530). If the command is not a special command, operation continues as data bytes are received as described above in FIG. 4, block 425.

However, if the command is a special command, then buffer management logic 330 notifies command generation unit 320. Since all the bytes for this command are known to be valid, then command generation unit 320 may generate the double word command packet and a control command corresponding to the double word command prior to finishing the command build (i.e. as the data is still being accumulated). Command generation unit 320 may send the control command to tunnel control unit 130 of FIG. 2 for scheduling of the injected command and data packets into the tunnel (block 540). Command generation unit 320 may also send the command packet to upstream command buffer 250.

Command generation unit 320 continues building the command and counting double words of data that are stored in buffer storage 345 of data path logic unit 340 until the double word count reaches 16 (block 550). When the double word count reaches 16, command generation unit 320 finishes building the command and generates the data packet using the 16 contiguous double words of received data. Command generation unit 320 then causes the data packet to be sent to upstream data buffer 260 of FIG. 2 (block 560). Command generation unit 320 then begins a new command build (block 465) and operation continues as described above. Since the control command has already been sent to tunnel control unit 130 for scheduling, tunnel control unit 130 may arbitrate for the upstream command while the data packets are being created.

Referring to FIG. 6, a diagram of one embodiment of a sized write data packet in byte mode is shown. The sized write byte mode packet includes four bytes (one double word) of byte mask bits and up to eight double words (32 bytes) of data. The byte mode data packet is one byte or eight bits [7:0] wide. Each byte may be sent in a respective clock cycle or bit time. The byte mask bits identify which data bytes within the packet are valid. For example in bit time 0, mask [7:0] corresponds to data bytes [7:0], mask [15:8] corresponds to data bytes [15:8] and so on. The data packets are arranged in ascending address order. In one embodiment, a logic one in a mask bit position may indicate a valid data byte. Although in other embodiments, a logic zero in a mask bit position may indicate a valid byte. It is also noted that other embodiments are contemplated that include data packets having other numbers of bits.

Referring to FIG. 7, a diagram of one embodiment of a sized write data packet in double word mode is shown. The sized write double word data packet includes from four to 64 bytes (i.e. one to 16 double words of data in double word multiples). The data bytes are arranged in ascending address order. The double word mode data packet is one byte or eight bits [7:0] wide. Each byte in the packet may be sent in a respective clock cycle or bit time. It is noted that other embodiments are contemplated that include data packets having other numbers of bits.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus for providing packets in a peripheral interface circuit, said apparatus comprising:
   a buffer configured to accumulate data received on a first bus; and
   a control unit coupled to said buffer and configured to transmit a data packet containing a first number of bytes of said data in response to detecting that any of said bytes of said data is invalid;

wherein said control unit is further configured to transmit said data packet containing a second number of bytes of said data in response to detecting that all of said bytes are valid.

2. The apparatus as recited in claim 1, wherein said control unit is further configured to detect whether any intervening bytes in a contiguous group of data forming said first number of bytes received in said buffer is invalid, and to generate said data packet containing said first number of bytes in response to detecting any intervening invalid bytes in said contiguous group of data forming said first number of bytes.

3. The apparatus as recited in claim 2, wherein said first number of bytes includes up to 32 bytes of data and four bytes of masking information.

4. The apparatus as recited in claim 3, wherein said masking information is indicative of which of said first number of bytes of data in said data packet is valid.

5. The apparatus as recited in claim 4, wherein said control unit is further configured to detect whether any intervening bytes in a contiguous group of data forming said second number of bytes received in said buffer is invalid, and to generate said data packet containing said second number of bytes in response to detecting no intervening invalid bytes in said contiguous group of data forming said second number of bytes.

6. The apparatus as recited in claim 5, wherein said second number of bytes includes up to 16 contiguous double words of data.

7. The apparatus as recited in claim 1, wherein said control unit is further configured to generate said data packet containing a third number of bytes of data in response to detecting an invalid data byte after receiving said third number of bytes in a contiguous group of data.

8. The apparatus as recited in claim 7, wherein said third number of bytes includes up to 16 contiguous double words of data received prior to said invalid data byte.

9. The apparatus as recited in claim 7, wherein said control unit is further configured to generate a command packet corresponding to said data packet, wherein said command packet is indicative of whether said data packet contains said first, said second or said third number of bytes of data.

10. The apparatus as recited in claim 9, wherein said control unit is further configured to generate a control command including a subset of information in said command packet.

11. A method for providing packets in a peripheral interface circuit, said method comprising:
   accumulating data received on a first bus;
   detecting whether any of said accumulated data is invalid;
   transmitting a data packet containing a first number of bytes of said data in response to detecting that any of said bytes of said data is invalid; and
   transmitting said data packet containing a second number of bytes of said data in response to detecting that all of said bytes are valid.

12. The method as recited in claim 11 further comprising detecting whether any intervening bytes in a contiguous group of data forming said first number of bytes received in said buffer is invalid, and generating said data packet containing said first number of bytes in response to detecting any intervening invalid bytes in said contiguous group of data forming said first number of bytes.

13. The method as recited in claim 12, wherein said first number of bytes includes up to 32 bytes of data and four bytes of masking information.

14. The method as recited in claim 13, wherein said masking information is indicative of which of said first number bytes of data in said data packet is valid.

15. The method as recited in claim 14 further comprising detecting whether any intervening bytes in a contiguous group of data forming said second number of bytes received in said buffer is invalid, and generating said data packet containing said second number of bytes in response to detecting no intervening invalid bytes in said contiguous group of data forming said second number of bytes.

16. The method as recited in claim 15, wherein said second number of bytes includes up to 16 contiguous double words of data.

17. The method as recited in claim 11 further comprising generating said data packet containing a third number of bytes of data in response to detecting an invalid data byte after receiving said third number of bytes in a contiguous group of data.

18. The method as recited in claim 17, wherein said third number of bytes includes up to 16 contiguous double words of data received prior to said invalid data byte.

19. The method as recited in claim 17 further comprising generating a command packet indicative of whether said data packet is formatted in said first format or said second format.

20. The method as recited in claim 19 further comprising generating a control command including a subset of information in said command packet.

21. A computer system comprising:
   a processor;
   one or more input/output nodes each including a peripheral interface circuit including an apparatus comprising:
   a buffer configured to accumulate data received on a first bus; and
   a control unit coupled to said buffer and configured to transmit a data packet containing a first number of bytes of said data in response to detecting that any of said bytes of said data is invalid;
   wherein said control unit is further configured to transmit said data packet containing a second number of bytes of said data in response to detecting that all of said bytes are valid.

22. The computer system as recited in claim 21, wherein said control unit is further configured to detect whether any intervening bytes in a contiguous group of data forming said first number of bytes received in said buffer is invalid, and to generate said data packet containing said first number of bytes in response to detecting any intervening invalid bytes in said contiguous group of data forming said first number of bytes.

23. The computer system as recited in claim 22, wherein said first number of bytes includes up to 32 bytes of data and four bytes of masking information.

24. The computer system as recited in claim 23, wherein said masking information is indicative of which of said first number bytes of data in said data packet is valid.

25. The computer system as recited in claim 24, wherein said control unit is further configured to detect whether any intervening bytes in a contiguous group of data forming said second number of bytes received in said buffer is invalid, and to generate said data packet containing said second number of bytes in response to detecting no intervening invalid bytes in said contiguous group of data forming said second number of bytes.

26. The computer system as recited in claim 25, wherein said second number of bytes includes up to 16 contiguous double words of data.

27. The computer system as recited in claim 21, wherein said control unit is further configured to generate said data packet containing a third number of bytes of data in response to detecting an invalid data byte after receiving said third number of bytes in a contiguous group of data.

28. The computer system as recited in claim 27, wherein said third number of bytes includes up to 16 contiguous double words of data received prior to said invalid data byte.

* * * * *